United States Patent
Ni

(10) Patent No.: US 11,552,475 B2
(45) Date of Patent: Jan. 10, 2023

(54) SYSTEMS AND METHODS FOR STATIONARY ENERGY STORAGE SYSTEM OPTIMIZATION

(71) Applicant: Cummins Power Generation IP, Inc., Minneapolis, MN (US)

(72) Inventor: Yunxin Ni, Roseville, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 6 days.

(21) Appl. No.: 17/248,286

(22) Filed: Jan. 19, 2021

(65) Prior Publication Data
US 2021/0281073 A1    Sep. 9, 2021

Related U.S. Application Data

(63) Continuation of application No. 16/189,662, filed on Nov. 13, 2018, now Pat. No. 10,897,136.

(51) Int. Cl.
| | | |
|---|---|---|
| H01M 10/46 | (2006.01) | |
| H02J 3/32 | (2006.01) | |
| H01M 10/42 | (2006.01) | |
| H01M 10/44 | (2006.01) | |
| H02J 7/00 | (2006.01) | |

(52) U.S. Cl.
CPC ............ H02J 3/32 (2013.01); H01M 10/425 (2013.01); H01M 10/44 (2013.01); H02J 7/0026 (2013.01); H02J 7/0029 (2013.01)

(58) Field of Classification Search
CPC .. H02J 7/0029; H02J 3/32; H02J 3/003; H02J 3/38; H02J 3/466; H01M 10/46; H01M 10/44; H01M 10/425; Y02E 60/10; Y04S 10/50

USPC ........ 320/112, 132, 135, 136, 149; 324/427, 324/432, 433, 435; 340/636.1, 636.12, 340/636.19, 636.2; 702/63, 64
See application file for complete search history.

(56) References Cited

U.S. PATENT DOCUMENTS

| | | |
|---|---|---|
| 2014/0172183 A1 | 6/2014 | Beeman |
| 2017/0104332 A1 | 4/2017 | Wenzel et al. |
| 2017/0331292 A1 | 11/2017 | Rive et al. |
| 2017/0371306 A1 | 12/2017 | Sossan et al. |

FOREIGN PATENT DOCUMENTS

CN          102624017          8/2012

OTHER PUBLICATIONS

"Dynamic Programming", AMP, Chapter 11, pp. 320-362.
(Continued)

*Primary Examiner* — Edward Tso
(74) *Attorney, Agent, or Firm* — Foley & Lardner LLP

(57) ABSTRACT

Systems and methods for controlling power flow to and from an energy storage system are provided. One implementation relates to an energy storage system comprising an energy storage device, an inverter configured to control a flow of power out of the energy storage device, a rectifier configured to control the flow of power into the energy storage device and one or more controllers. The one or more controllers may be configured to determine a schedule of a plurality of time periods based on historical price data. Each of the plurality of time periods may be associated with one of a state of charging, discharging, or idle. The one or more controllers may be configured to control the inverter and the rectifier based on the determined schedule.

19 Claims, 4 Drawing Sheets

(56) References Cited

OTHER PUBLICATIONS

Boileau, Martin, "A Child's Guide to Dynamic Programming", 20 pages.
Choi et al., "Optimal Scheduling of Energy Storage System for Self-Sustainable Base Station Operation Considering Battery Wear-Out Cost", Jun. 16, 2016, 19 pages.
International Search Report and Written Opinion for International Application No. PCT/US2019/060884, dated Feb. 17, 2020, 11 pages.

SYSTEMS AND METHODS FOR STATIONARY ENERGY STORAGE SYSTEM OPTIMIZATION

CROSS-REFERENCE TO RELATED PATENT APPLICATION

The present application is a continuation of U.S. patent application Ser. No. 16/189,662, filed Nov. 13, 2018, the contents of which are incorporated herein by reference in their entirety.

TECHNICAL FIELD

The present disclosure relates generally to the field of energy storage systems as well as generators. More particularly, the present disclosure relates to systems and methods for controlling operation of an energy storage system for charging, discharging, and idling.

BACKGROUND

Energy storage technologies including battery storage technologies can be used to reduce operational cost of electrical networks including electrical networks connected to generator sets. These electrical networks and systems can be used to power a wide variety of loads with changing demand smoothing uncertainty.

SUMMARY

One implementation of the disclosure relates to an energy storage system. The energy storage system may comprise an energy storage device, an inverter configured to control a flow of power out of the energy storage device, a rectifier configured to control the flow of power into the energy storage device and one or more controllers. The one or more controllers may be configured to determine a schedule of a plurality of time periods based on historical data relating to the plurality of time periods. The generate schedule may indicate, for each of the time periods, whether the energy storage system is to be placed in a charging state, a discharging state, or an idle state during the time period. The one or more controllers may be configured to control the inverter and the rectifier based on the determined schedule.

In some implementations, the energy storage system further comprises a transceiver. The one or more controllers may be further configured to receive data, via the transceiver, comprising the historical data associated with a historical plurality of time periods, the data comprising historical price data. The one or more controllers may be further configured to check a charge level of the energy storage device, determine a number of time periods of the plurality of time periods available to discharge the energy storage device based on the charge level, and determine the schedule of the plurality of time periods based on the received data and the number of time periods of the plurality of time periods available to discharge the energy storage device. In some implementations, the one or more controllers are further configured to control the flow of power into or out of the energy storage device based on the schedule of the plurality of time periods. In some implementations, the one or more controllers are further configured to determine the schedule of the plurality of time periods based on the received data by iterating through the received data by the number of time periods of the plurality of time periods available to discharge the energy storage device. During each iteration a largest value of historical price data is identified, and the respective time period associated with the largest value of historical price data is ignored in subsequent iterations. In some implementations, the one or more controllers are further configured to discharge the energy storage device to an electrical grid during each of the respective time periods associated with the largest value of historical price data in each iteration. In some implementations, the inverter and the rectifier are implemented within a bidirectional inverter.

Another implementation of the disclosure relates to a method, executing on one or more controllers, of controlling a flow of power to and from an energy storage system. The method comprises receiving historical data associated with a plurality of time periods corresponding to a future plurality of time periods, checking a charge level of an energy storage device of the energy storage system, determining a number of time periods of the future plurality of time periods available to discharge the energy storage device, and generating a schedule for the future plurality of time periods based on the received data and the number of time periods of the future plurality of time periods available to discharge the energy storage device. Each respective time period may be associated in the schedule with one of a charging, discharging, or idle state.

In some implementations, the method may further comprise controlling the flow of power into or out of the energy storage device based on the schedule during the future plurality of time periods. In some implementations, wherein the historical data comprises historical price data, generating the schedule for the future plurality of time periods further comprises iterating through the historical data by the number of time periods of the future plurality of time periods available to discharge the energy storage device. During each iteration a largest value of historical price data may be identified, and the respective time period associated with the largest value of historical price data is ignored in subsequent iterations. In some implementations, each respective time period associated with the largest value of historical price data in each iteration is associated with discharging the energy storage device. In some implementations, generating the schedule for the future plurality of time periods comprises iterating through the historical data by the number of time periods of the future plurality of time periods available to discharge the energy storage device. During each iteration a largest value of historical price data may be identified, and the respective time period associated with the largest value of historical price data is ignored in subsequent iterations. In some implementations, the method further comprises controlling the flow of power out of the energy storage device during the respective plurality of time periods associated with the largest value of historical price data of each iteration. In some implementations, the method further comprises determining one or more of the values of the respective time periods associated with the largest value of historical price data in each iteration is greater than a minimum price value and during each of the respective time periods with associated values greater than the minimum price value, discharging the energy storage device to an electrical grid. In some implementations, the flow of power into or out of the energy storage device is controlled by controlling a bidirectional inverter. In some implementations, the energy storage device comprises at least one of a battery or a supercapacitor.

Another implementation of the disclosure relates to a generator system. The generator system comprises an energy storage device, a generator set configured to generate power to drive one or more loads. One of the one or more loads may be the energy storage device when the energy storage device is configured to charge. The generator system may further comprise an inverter configured to control a flow of power out of the energy storage device, a rectifier configured to control the flow of power into the energy storage device, and one or more controllers. The one or more controllers may be configured to determine a schedule of a plurality of time periods, wherein each of the plurality of time periods is associated with one of a state of charging, discharging, or idle, and control the inverter and the rectifier based on the determined schedule.

In some implementations, the generator system further comprises a transceiver. The one or more controllers may be further configured to receive historical data, via the transceiver, comprising historical price data associated with a plurality of time periods indicative of the plurality of time periods, check a charge level of the energy storage device, determine a number of time periods of the plurality of time periods available to discharge the energy storage device based on the charge level, and determine the schedule of the plurality of time periods based on the received data and the number of time periods of the plurality of time periods available to discharge the energy storage device. In some implementations, the one or more controllers are further configured to control the flow of power into or out of the energy storage device based on the schedule of the plurality of time periods, wherein the flow of power into the energy storage device is from the generator set and the flow of power out of the energy storage device is to an electrical grid. In some implementations, the one or more controllers are further configured to determine the schedule of the plurality of time periods based on the received data by iterating through the received data by the number of time periods of the plurality of time periods available to discharge the energy storage device, wherein during each iteration a largest value of historical price data is identified and the respective time period associated with the largest value of historical price data is ignored in subsequent iterations. In some implementations, the one or more controllers are further configured to discharge the energy storage device to the electrical grid during each of the respective time periods associated with the largest value of historical price data in each iteration. In some implementations, the inverter and the rectifier are combined into a bidirectional inverter.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
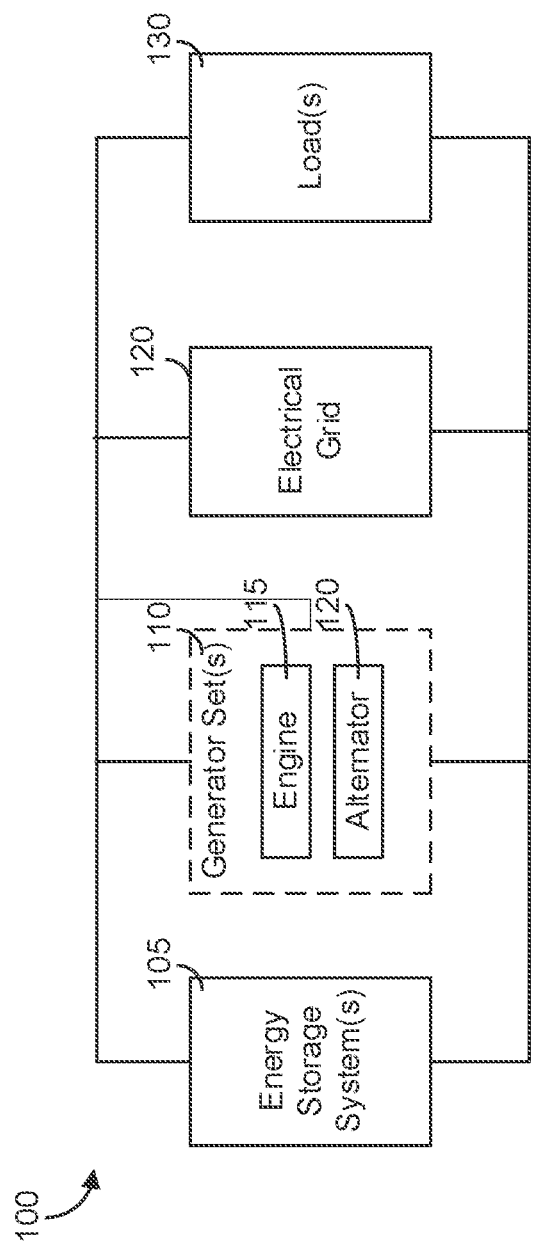
FIG. 1 is a block diagram illustrating an energy storage system environment according to an example implementation.

Before turning to the figures, which illustrate some example implementations in detail, it should be understood that the application is not limited to the details or methodology set forth in the description or illustrated in the figures. It should also be understood that the terminology is for the purpose of description only and should not be regarded as limiting.

Referring generally to the figures, systems and methods of energy storage systems that may be used to power loads are provided according to example implementations. In some implementations, the energy storage systems work in conjunction with generators where the energy storage systems and/or the generators are used to provide power to one or more loads, such as a local power network or grid (e.g., a power grid powering a location, such as a building, room or group of rooms, etc.). The power demands of the loads may vary with changing conditions, such as increasing and decreasing draw on the local grid. To address the changing load demand, the energy storage systems may increase or decrease the output power generated, such as increasing power output with increased load, or decreasing the power output with decreased power demand. In some implementations, the energy storage systems may work in conjunction with one or more generator sets (i.e., gensets) to increase or decrease the output power generated, store output power from the gensets, store power from an electrical grid, provide power to an electrical grid and the like.

The present disclosure provides example systems and methods for utilizing an energy storage system. An exemplary energy storage system includes an energy storage device (e.g., one or more batteries, capacitors or capacitor banks, etc.) and an inverter configured to control flow of power to and from the energy storage device. The inverter may be a bidirectional inverter configured to bi-directionally transmit power between the energy storage device and one or more generator sets coupled to the inverter (e.g., an output of the one or more generator sets). The energy storage system may control the inverter to store power (e.g., excess power) generated by the genset(s) by charging the energy storage device and/or transmit power stored in the energy storage device to the load(s) based on one or more operating conditions by discharging the energy storage device.

In some implementations, energy storage systems are configured to self-schedule operation of the system (e.g., charging, discharging, running idle, etc.) based on received and analyzed data. Received data may include a history of electrical power pricing with enumerated time periods. Received data may also include other market economic conditions and/or forecasts. Received data may also include user manual input rules, wherein the self-schedule operation of the system is configured to follow the user manual input rules in place of or in consideration with the received and analyzed data. The energy storage systems may further be configured to self-schedule operation of the system based on self-computed energy storage device capacity and/or safety constraints. The systems and methods described solve a problem of simpler systems that run an associated genset and provide power to a utility grid when a spot power price is greater than the fuel cost for the genset plus the genset overhead cost (genset hourly capital amortization+operation overhead costs). Operation overhead may include conversion loss factor when using energy storage systems. In some energy storage system implementations, the system may be configured to run a fixed run schedule. In some energy storage system implementations, the system may be configured to provide power to a utility grid (e.g., sell power) whenever power prices are greater than the cost to charge energy storage systems (e.g., genset costs plus fuel costs plus energy storage conversion losses). Some such systems may be configured to provide power to a utility grid whenever the first opportunity to do so occurs which may not be the most effective time period. In some energy storage system implementations, the system receives data comprising electrical power pricing with enumerated time periods and the system is configured to analyze the data to look at a future time period (e.g., one or more hours, one or more days, one or more weeks, etc.) and choosing the top two or more peak power demand time periods to provide power to a utility grid. Energy storage systems and methods result in non-centralized local economic optimization that can be installed in and used independently by the energy storage system whether or not attached to one or more other energy storage systems and/or gensets.

In some embodiments, the energy storage system may control operation of one or more of the gensets. For example, the energy storage system may be configured to generate and transmit signals to the gensets configured to control a state of the gensets (e.g., activate and/or deactivate the gensets) or may be one member of a masterless network of self-coordinating gensets (also known as masterless load demand, or MLD). The energy storage system may monitor network power conditions and may activate and/or deactivate gensets in the network in order to meet varying load demand. By deactivating gensets when not needed to meet demand and/or utilizing excess energy previously stored in the energy storage system, the energy storage system reduces overall runtime, and fuel consumption, of the gensets. In some embodiments, the energy storage system may prevent fast cycling and only change a state of a genset if the energy storage system estimates the power demand can be met under the changed configuration for at least a threshold amount of time.

Referring to FIG. 1, a block diagram illustrating an energy storage system environment 100 is shown according to an example implementation. The energy storage system environment includes an energy storage system 105, one or more generator sets (gensets) 110, an electrical grid 120 and one or more loads 130.

In some implementations, energy storage system 105 is configured to provide power to supplement other power sources, e.g., the power from electrical grid 120 to drive load 130 in periods of high demand and store excess power from electrical grid 120 in periods of low demand. In another example, the energy storage system 105 is configured to provide power to supplement the power generated by genset 110 to drive load 130 in periods of high demand and store excess power generated by genset 110 in periods of low demand. In some implementations, energy storage system 105 can operate in parallel with genset 110 to meet larger load demand than genset 110 would be capable of supporting on its own. In some embodiments, energy storage system 105 can operate on its own for at least a period of time to supply some loads without genset 110. Energy storage system 105 may be configured to charge an energy storage device of energy storage system 105 in a manner such that genset 110 is maintained operating in a fuel efficient operating range when external system demand/load decreases, storing the excess power (e.g., rather than operating genset 110 at an operating point above or below an efficient range to charge the energy storage device). Alternatively, energy storage system 105 may be configured to source power onto a parallel AC connection when external system demand/load increases (and discharge an energy storage device of energy storage system 105) such that genset 110 is maintained operating in a fuel efficient operating range, rather than increase genset 110 output into an inefficient operating range to service the increased load. Energy storage system 105 may also serve to provide a surge capacity, and may supply power immediately, or nearly immediately, upon sudden frequency dips or voltage drops (e.g., in the case of "dumb" loads, or loads that do not provide information about when changes in load demand will occur in advance of the changes).

Continuing with FIG. 1, in some implementations, a genset 110 includes an engine 115 coupled to an alternator 120. Engine 115 may be any type of machine configured to convert energy, such as fuel, into mechanical energy (e.g., motion). Engine 115 may be an internal combustion engine, such as a diesel engine. Alternator 120 may be any type of machine configured to convert mechanical energy into electrical energy, such as an alternating current. In some embodiments, genset 110 may include different and/or additional components than engine 115 and alternator 120 (e.g., a hydraulically powered generator driven using hydraulic fluid). Genset 110 may be a mastered or masterless system (e.g., a masterless load demand genset system or a mastered paralleled genset system). While FIG. 1 illustrates a single energy storage system 105 connected in parallel with a genset 110, it should be understood that any number of energy storage systems 105 and any number of gensets 110 may be utilized.

In some implementations, energy storage system 105 may operate as an independent module that adds energy storage capacity to genset 110. In some embodiments, the energy storage system 105 may be added to an existing genset 110 or coupled paralleled to electrical grid 120 or coupled to a local electrical grid operated by the genset 110. In some implementations, the energy storage system 105 may be added to a genset 110 to convert the genset 110 into a hybrid generator system by sourcing to or charging from the local electrical grid operated by the genset 110. Energy storage system 105 may have an interface (e.g., control interface, network connection, etc.) through which energy storage system 105 may communicate with genset 110 (e.g., receive signals from and/or transmit signals to genset 110).

Figure 2:
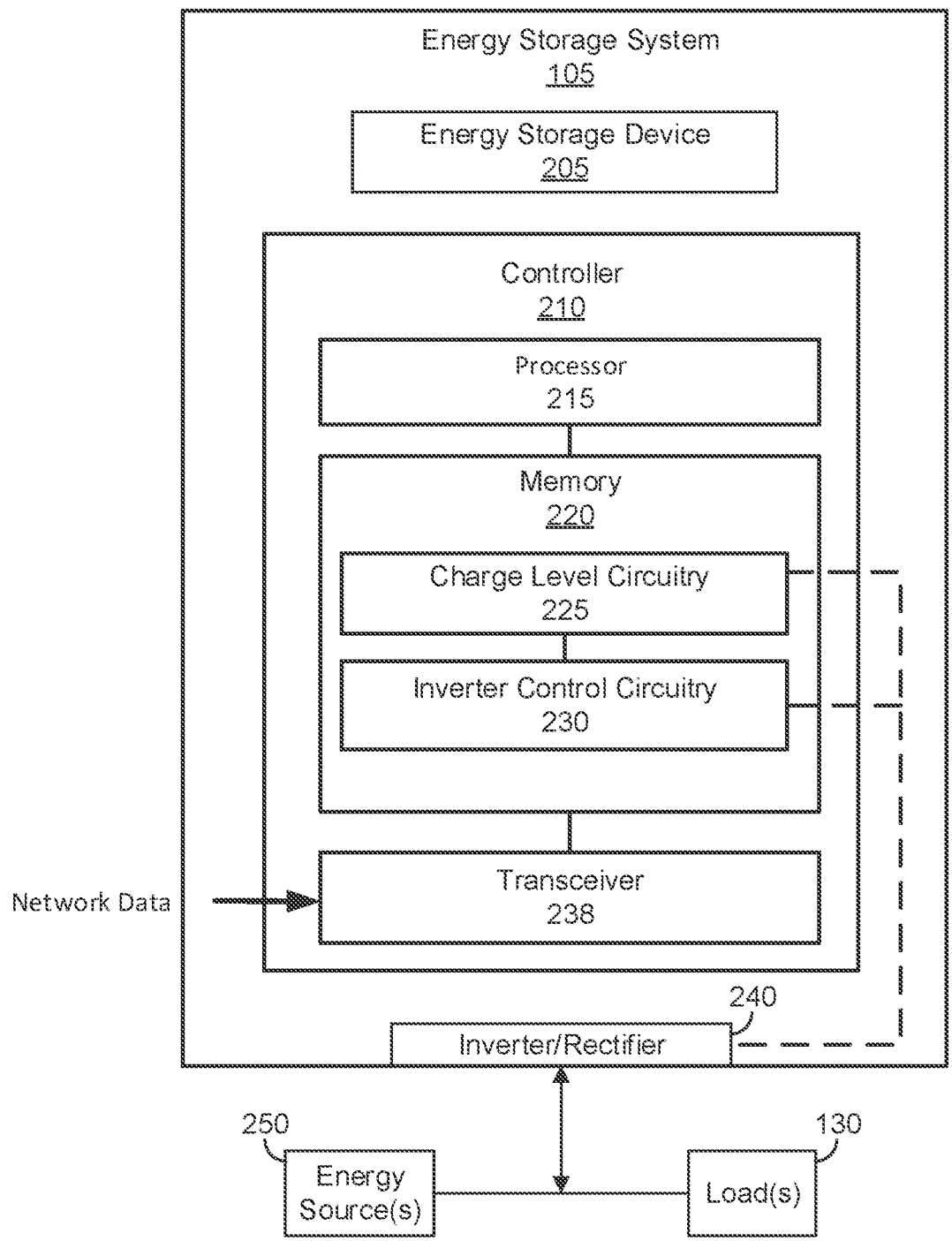
FIG. 2 is an example implementation of the energy storage system of FIG. 1.

FIG. 2 illustrates a more detailed example implementation of the energy storage system 105 of FIG. 1. In some implementations, the energy storage system 105 includes an energy storage device 205, controller 210, and an inverter/rectifier 240. The controller 210 may include a processor 215, memory 220, and a transceiver 238. The memory 220 may include discharging circuitry 225, idling circuitry 230, and charging circuitry 235.

Energy storage device 205 may be, or include, any type of device capable of storing electrical energy, such as one or more batteries, one or more capacitors (e.g., ultracapacitors), etc. Energy storage system 105 also includes an inverter/rectifier 240 or bidirectional inverter configured to transmit power to and/or receive power from one or more AC electrical sources and one or more loads 130. In some implementations, the inverter/rectifier 240 is configured to transmit power to and/or receive power from one or more power transmission lines configured to transmit power between genset(s) 110 and load(s) 130. Inverter/rectifier 240 may be a bidirectional inverter configured to bi-directionally transmit power to and from energy storage device 205. For example, inverter/rectifier 240 can transmit power stored in energy storage device 205 to provide power to electrical grid 120.

In some embodiments, energy storage system 105 may include multiple inputs and/or outputs (e.g., power inputs/outputs). For example, energy storage system 105 may include an alternating current (AC) input configured to receive AC power from an external source (e.g., electrical grid 120) and store the power in energy storage device 205 and/or transmit the power to load(s) 130 via inverter/rectifier 240. In some embodiments, the AC power may be received and transmitted to a DC bus of energy storage system 105 (e.g., via an AC-DC converter of energy storage system 105). In one such embodiment, energy storage system 105 may provide power grid distribution and isolation via the AC input, such as by breaking up and/or isolating portions of a local grid by receiving AC power at the AC input, transmitting the power to the DC bus of energy storage system 105, and outputting AC power through inverter/rectifier 240. Alternatively, two energy storage devices 105, each with inverter/rectifiers 240, can be placed back to back, one on a first grid and one on a second grid and coupled to share power via their DC buses. This may help increase fault tolerance, simplify and/or reduce power cabling, provide local surge protection (e.g., via energy storage device 205), and/or provide resilience against damage.

Energy storage system 105 may additionally, or alternatively, include a direct current (DC) input. The DC input may allow for DC bus paralleling using the internal DC bus of energy storage system 105 (not shown) and connections to other DC buses (e.g., operating with other energy storage systems and/or gensets, such as variable speed gensets, with an interim DC bus). In some embodiments, the other DC buses may have similar voltage to the DC bus of energy storage system 105. In other embodiments, the other DC buses may have a different voltage, and energy storage system 105 may include a DC-DC converter to convert the voltage of the input power to the internal DC bus voltage.

Energy storage system 105 further includes a controller 210 configured to control operation of inverter 240. Controller 210 may include a processor 215, which may be any type of general purpose or special purpose processor (e.g., FPGA, CPLD, ASIC, etc.). Controller 210 may also include a memory 220, which may include any type of computer or machine-readable storage medium (e.g., RAM, ROM, PROM, magnetic storage, optical storage, flash storage, etc.). In some embodiments, controller 210 may include an input/output (I/O) module or other control interface through which controller 210 can communicate with other components (e.g., receive data from and/or transmit data and/or control signals to other components, such as genset(s) 110).

Controller 210 may include one or more circuits configured to implement one or more functions of controller 210. In some embodiments, the circuits may be implemented as computer or machine-readable instructions stored in memory 220 that are executable by processor 215 to perform the functions. In some embodiments, the circuits may additionally or alternatively be implemented, in whole or in part, via hardware circuits (e.g., integrated circuits).

In some implementations controller 210 includes charge level circuitry 225. Charge level circuitry 225 may be configured to determine a charge level of an energy storage device 205. Charge level circuitry 225 may control the state of inverter/rectifier 240 due to operational conditions based on analyzing data received (e.g., via transceiver 239). In some implementations, controller 210 includes inverter control circuitry 230. Inverter control circuitry 230 may be configured to control an operational state of inverter/rectifier 240. Inverter control circuitry 230 may control the state of inverter/rectifier 240 due to operational conditions based on analyzing data received (e.g., via transceiver 238). Energy source(s) 250 are energy sources used to charge the energy storage device 205 such as generator sets and electrical grids. Input power may also be received from one or more other external energy sources including but not limited to photovoltaic-powered sources, solar-powered sources, wind-powered sources, solid oxide fuel cells, PEM fuel cells, geo-powered sources, thermal-powered sources, electric-powered sources, etc. Power from energy source(s) 250 may be stored in energy storage device 205 and/or transmitted to load(s) 130 and may be used to supplement power on a local grid.

Figure 3:
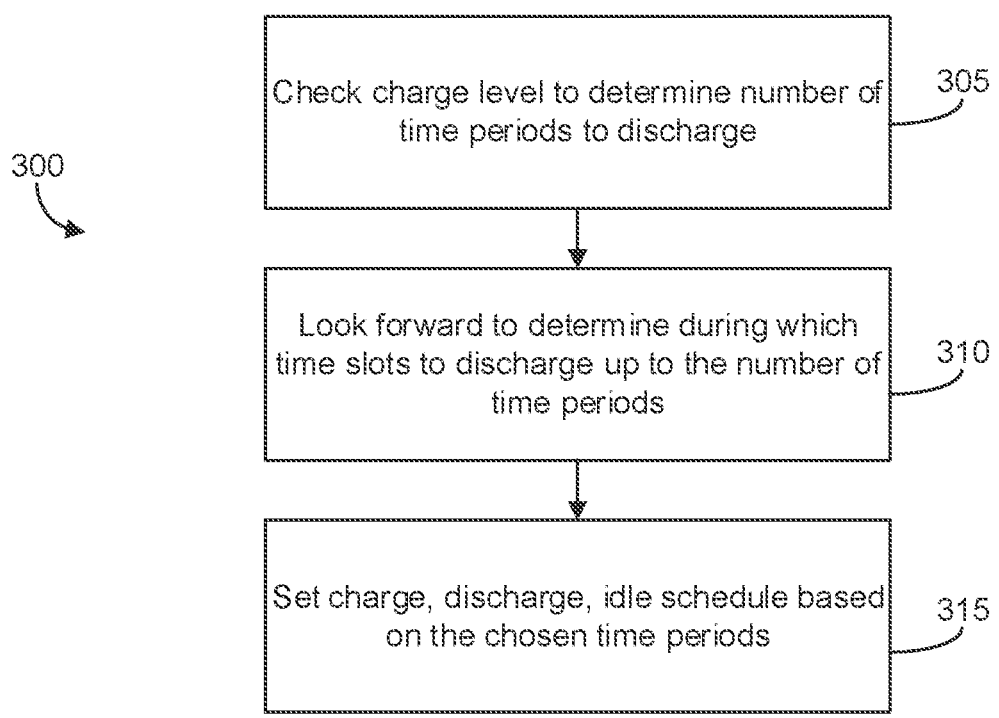
FIG. 3 is a flow diagram of a process for controlling an energy storage system according to an example implementation.

FIG. 3 illustrates a flow diagram of a process 300 for controlling an energy storage system according to an exemplary embodiment. Process 300 may be executed by controller 210 of energy storage system 105 (e.g., by charge level circuitry 225). In brief, process 300 comprises checking charge level to determine a number of time periods to discharge, looking forward to determine which time periods to discharge up to the number of time periods, and setting charge, discharge, idle schedule based on the chosen time periods.

Still referring to FIG. 3 and in more detail, a charge level is checked to determine a number of time periods to discharge an energy storage system (e.g., energy storage system 105) at 305. In some implementations, the charge level is associated with an energy storage device (e.g., energy storage device 205) and the charge level is the number of time periods for which the energy storage has additional capacity to discharge power. For example, the additional capacity may be capacity additional to a projected capacity need. As a specific example, the energy storage device 205 may have enough anticipated excess capacity to discharge for 40 time periods of 5 minutes each during a future 24 hour period. In another example, the energy storage device has enough anticipated excess capacity to discharge for 6 time periods of 60 minutes each during a future 48 hour period.

Time periods slots during a future period are determined during which to discharge up to the charge level (the number of available time periods) at 310. In some implementations, the number of time period slots for selection are the number of time periods for which the energy storage has additional capacity to discharge power. These time period slots may be distributed at various times throughout the future scheduled operation time. For example, time period slots are determined for the next 24 hours. The time period slots may be chosen as the time slots for which it is anticipated that discharging the energy storage would be most cost effective or get the best price when providing power back to an electrical grid. In some implementations, the time period slots may be chosen as the time slots for which it is anticipated that there will be peak power demand. As a specific example, a charge level of 5 means that there are 5 time period slots during which the energy storage device 205 may be discharged during the next 24 hours. The 5 time period slots are chosen to maximize a price of the energy discharged based on historical pricing data. In other examples, the 5 time period slots may be chosen as the anticipated peak power demand time period slots or some combination.

Charge, discharge, and idle schedule is set based on the chosen time periods at 315. In some implementations, an energy storage system (e.g., energy storage system 105) is scheduled to perform the functions of charging an energy storage device (e.g., energy storage device 205), discharging the energy storage device, or leaving the energy storage device idle (e.g., presenting a high impedance state to any connected electrical network). The energy storage system may be scheduled for one of a charge, discharge, or idle state with a granularity of a particular time period (e.g., 5 minutes, 20 minutes, 1 hour, etc.). A charge, discharge, and idle schedule may be set where the time period slots determined at 310 are set in the schedule to discharge the energy storage device. The energy storage device when discharging may be providing electrical power to an electrical grid. At other times, when the energy storage device is discharging, the energy storage device may be providing power to assist or substitute for a generator set.

Figure 4:
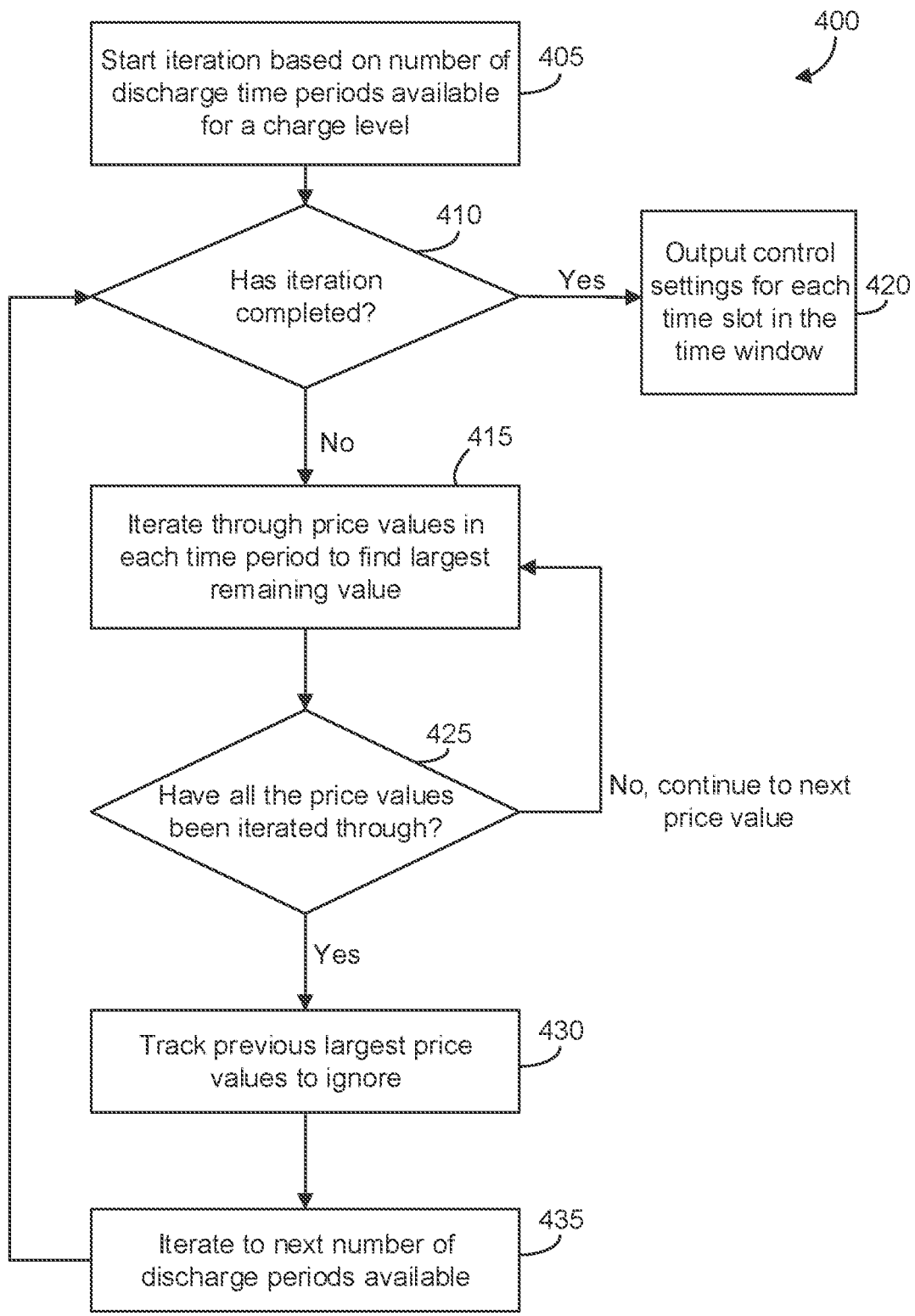
FIG. 4 is a flow diagram of a process for outputting control settings for an energy storage system according to an example implementation.

FIG. 4 illustrates a flow diagram of a process 400 for outputting control settings for an energy storage system (e.g., energy storage system 105) according to an example implementation. Process 400 may be executed by a controller 210 of energy storage system 104 (e.g., by charge level circuitry 225). In brief, process 400 comprises starting iterating based on the number of discharge time periods available for a charge level. If the iterations have completed, the process 400 ends by outputting the control settings for each time window. If the iterations have not completed, the process 400 continues by iterating through the price values in each time period to find the largest remaining value. The price value iteration continues until all the price values have been checked. The process 400 continues by tracking all previous largest price values so they can be ignored in future iterations and iterating to the next number of discharge periods available.

Still referring to FIG. 4 and in more detail, an iteration is started based on the number of discharge time periods available for a charge level at 405. In some implementations, the charge level of an energy storage device (e.g., energy storage device 205) is checked to determine a number of time periods to discharge using an energy storage system (e.g., energy storage system 105). In some implementations, the charge value is an integer value indicating the number of time periods for which the energy storage device is able to discharge because of additional anticipated capacity. If a determination is made that the iteration has completed at 410, then control settings are output for each time window at 420, wherein each time window is an amount of time equal to a discharge time period (e.g., 5 minutes, 20 minutes, 1 hour, etc.) Control setting for each time window may be one of charging (e.g., a value set to 1), discharging (e.g., a value set to −1), or idling (e.g., a value set to 0). If a determination is made that the iteration has not completed at 410 because the number of discharge time periods available has not yet been reached, then the process continues to 415.

Price values in each time period are iterated through to find the largest remaining value at 415. In some implementations, historical price values are received for associated time periods to the time periods being iterated through and are used. Historical price values may be randomized from a larger pool of price values associated with the time periods. If a determination is made at 425 that all the price values have not been iterated through, the next price value associated with the next time period is checked at 415. Every time a price value is found that is larger than the previous highest price value, the new price value is stored as well as the associated time period. If a determination is made at 425 that all the price values have been iterated through and checked, then the process continues to 430. In some implementations, a time period may be associated with an obligation. If a time period is associated with an obligation, then the energy storage system is obligated to provide power during those times. An obligation may override any pricing consideration and one of the iterations will be used in satisfying the obligation instead of finding the next highest price value.

Previous largest price values and their associated time periods are tracked in order to ignore them in remaining iterations based on the number of discharge time periods available for the charge level at 430. In some implementations, obligations are also tracked in order to ignore them in remaining iterations and the associated time period is stored. For each iteration, the highest price value and its associated time period is stored. This price value and associated time period is also tracked so that during the next iteration, it is not considered when trying to find the next highest price value and associated time period. Thus, a number of price values (and/or obligations) and associated time periods are recorded equal to the number of discharge time periods available and the price values are the highest aggregate price values available during the time window for the recorded time periods. The next number of discharge time periods available is iterated to at 435 and the process returns to 410 to determine if the iteration has completed.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program circuits executed by machines in networked environments. Generally, program circuits include routines, programs, objects, components, data structures, etc., that perform particular tasks or implement particular abstract data types. Machine-executable instructions, associated data structures, and program circuits represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program circuits may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program circuits, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An energy storage system comprising:
   an energy storage device;
   an inverter configured to control a flow of power out of the energy storage device;
   a rectifier configured to control the flow of power into the energy storage device;
   a direct current (DC) to DC converter configured to convert a voltage of input DC power to a second voltage corresponding to an internal DC bus voltage of the energy storage device;
   one or more controllers configured to:
      generate a schedule based on data relating to energy costs, the generated schedule indicating whether the energy storage system is to be placed in a charging state, a discharging state, or an idle state during respective periods, wherein the one or more controllers are further configured to:
      check a charge level of the energy storage device;
      determine an amount of time the energy storage device is able to be discharged based on the charge level; and
      generate the schedule based on the data and the amount of time the energy storage device is able to be discharged; and
      control the inverter and the rectifier based on the schedule.

2. The energy storage system of claim 1, further comprising a transceiver, wherein the one or more controllers are further configured to receive the data relating to the energy costs, via the transceiver.

3. The energy storage system of claim 1, wherein the data comprises at least one of historical price data corresponding to past time periods, forecasted price data, and current market economic conditions.

4. The energy storage system of claim 1, wherein the one or more controllers are configured to generate the schedule based on manual input rules.

5. The energy storage system of claim 1, wherein the one or more controllers are configured to generate the schedule to discharge the energy storage device during a forecasted time of maximum price of energy costs, and to discharge the energy storage device during an anticipated time of peak power demand.

6. The energy storage system of claim 1, wherein the schedule comprises a plurality of time periods, and wherein the one or more controllers are further configured to determine the schedule of the plurality of time periods based on the data by iterating through the data by a number of time periods available to discharge the energy storage device, wherein during each iteration a largest value of data relating to energy costs is identified and the respective time period associated with the largest value of data relating to energy costs is ignored in subsequent iterations.

7. The energy storage system of claim 1, wherein the one or more controllers are further configured to control a flow of power into the energy storage device in the charging state from a first source, and control a flow of power out of the energy storage device in the discharging state to an electrical grid.

8. The energy storage system of claim 7, wherein the first source comprises at least one of a genset or other external power source, and wherein the other external power source comprises at least one of a photovoltaic-powered source, solar-powered source, wind-powered source, solid oxide fuel cell, PEM fuel cell, geo-powered source, thermal-powered source, and electric-powered source.

9. A method of controlling an energy storage system, executing on one or more controllers, the method comprising:
converting, by a direct current (DC) to DC converter, a voltage of input DC power to a second voltage corresponding to an internal DC bus voltage of an energy storage device of the energy storage system;
checking a charge level of the energy storage device;
determining an amount of time the energy storage device is able to be discharged based on the charge level;
generating a schedule based on data relating to energy costs and the amount of time the energy storage device is able to be discharged, wherein the schedule indicates whether the energy storage system is to be placed in a charging state, a discharging state, or an idle state during respective periods; and
controlling a flow of power to or from the energy storage device based on the schedule.

10. The method of claim 9, wherein controlling the flow of power comprises controlling a flow of power into the energy storage device in the charging state from a first source, and control a flow of power out of the energy storage device in the discharging state to an electrical grid.

11. The method of claim 10, wherein the first source comprises at least one of a genset or other external power source, and wherein the other external power source comprises at least one of a photovoltaic-powered source, solar-powered source, wind-powered source, solid oxide fuel cell, PEM fuel cell, geo-powered source, thermal-powered source, and electric-powered source.

12. The method of claim 9, further comprising receiving the data relating to energy costs, wherein the data comprises at least one of historical price data corresponding to past time periods, forecasted price data, and current market economic conditions.

13. The method of claim 9, wherein generating the schedule further comprises generating the schedule based on manually input data.

14. A system comprising,
an energy storage device;
a generator set configured to generate power to drive one or more loads, wherein one of the one or more loads is the energy storage device when the energy storage device is configured to charge;
an inverter configured to control a flow of power out of the energy storage device;
a rectifier configured to control the flow of power into the energy storage device;
a direct current (DC) to DC converter configured to convert a voltage of input DC power to a second voltage corresponding to an internal DC bus voltage of the energy storage device; and
one or more controllers configured to:
generate a schedule based on data relating to energy costs, the generated schedule indicating whether the energy storage system is to be placed in a charging state, a discharging state, or an idle state during respective periods, wherein the one or more controllers are further configured to:
check a charge level of the energy storage device;
determine an amount of time the energy storage device is able to be discharged based on the charge level; and
generate the schedule based on the data and the amount of time the energy storage device is able to be discharged; and
control the inverter and the rectifier based on the schedule.

15. The system of claim 14, wherein the one or more controllers are further configured to control the flow of power into or out of the energy storage device based on the schedule, wherein the flow of power into the energy storage device is from the generator set and the flow of power out of the energy storage device is to an electrical grid.

16. The system of claim 14, further comprising a transceiver, wherein the one or more controllers are further configured to receive the data relating to the energy costs, via the transceiver.

17. The system of claim 14, wherein the data comprises at least one of historical price data corresponding to past time periods, forecasted price data, and current market economic conditions.

18. The system of claim 14, wherein the one or more controllers are configured to generate the schedule to discharge the energy storage device during a forecasted time of maximum price of energy costs, and to discharge the energy storage device during an anticipated time of peak power demand.

19. The system of claim 14, wherein the inverter and the rectifier are combined into a bidirectional inverter.

* * * * *